US011238361B2

(12) United States Patent
Wei et al.

(10) Patent No.: US 11,238,361 B2
(45) Date of Patent: Feb. 1, 2022

(54) SIMULTANEOUSLY DRIVING ADJACENT QUBIT PAIRS

(71) Applicant: International Business Machines Corporation, Armonk, NY (US)

(72) Inventors: Xuan Wei, White Plains, NY (US); Sarah Elizabeth Sheldon, Tarrytown, NY (US); Maika Takita, Hudson, NY (US); Jay Michael Gambetta, Yorktown Heights, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 17/128,661

(22) Filed: Dec. 21, 2020

(65) Prior Publication Data

US 2021/0232962 A1 Jul. 29, 2021

Related U.S. Application Data

(63) Continuation of application No. 16/775,833, filed on Jan. 29, 2020, now Pat. No. 10,956,829.

(51) Int. Cl.
*G06N 99/00* (2019.01)
*G06N 10/00* (2019.01)

(52) U.S. Cl.
CPC .................. *G06N 10/00* (2019.01)

(58) Field of Classification Search
CPC ...................................... G06N 10/00
See application file for complete search history.

(56) References Cited

U.S. PATENT DOCUMENTS

| 10,282,675 | B2 * | 5/2019 | Bloom | G06N 10/00 |
|---|---|---|---|---|
| 10,352,992 | B1 * | 7/2019 | Zeng | G06N 10/00 |
| 2018/0225586 | A1 * | 8/2018 | Chow | G06N 10/00 |
| 2020/0042882 | A1 * | 2/2020 | Liu | G06N 10/00 |

OTHER PUBLICATIONS

List of all IBM related dockets, 2020.

* cited by examiner

*Primary Examiner* — Kurtis R Bahr
(74) *Attorney, Agent, or Firm* — Garg Law Firm, PLLC; Rakesh Garg; Douglas Pearson

(57) ABSTRACT

An embodiment includes (CR) gate having a first control qubit coupled with a first target qubit, and a second CR gate having a second control qubit coupled with a second target qubit and the first control qubit. The embodiment also includes controller circuitry for performing operations including first and second iterations of: during a first time period, directing respective CR pulses to the first and second control qubits; during a second time period, directing respective single qubit pulses to the first control qubit and to the second target qubit; during a third time period, directing respective CR pulses to the first and second control qubits; and during a fourth time period, directing respective single qubit pulses to the second control qubit and to the first target qubit.

20 Claims, 7 Drawing Sheets

SIMULTANEOUSLY DRIVING ADJACENT QUBIT PAIRS

GOVERNMENT RIGHTS

This invention was made with Government support under Contract No.: W911NF-14-1-0124 awarded by Army Research Office (ARO). The Government has certain rights in this invention.

TECHNICAL FIELD

The present invention relates generally to operating of quantum devices. More particularly, the present invention relates to simultaneously driving adjacent qubit pairs.

BACKGROUND

Hereinafter, a "Q" or "q" prefix in a word of phrase is indicative of a reference of that word or phrase in a quantum computing context unless expressly distinguished where used.

Molecules and subatomic particles follow the laws of quantum mechanics, a branch of physics that explores how the physical world works at the most fundamental levels. At this level, particles behave in strange ways, taking on more than one state at the same time, and interacting with other particles that are very far away. Quantum computing harnesses these quantum phenomena to process information.

The computers we use today are known as classical computers (also referred to herein as "conventional" computers or conventional nodes, or "CN"). A conventional computer uses a conventional processor fabricated using semiconductor materials and technology, a semiconductor memory, and a magnetic or solid-state storage device, in what is known as a Von Neumann architecture. Particularly, the processors in conventional computers are binary processors, i.e., operating on binary data represented in 1 and 0.

A quantum processor (q-processor) uses the odd nature of entangled qubit devices (compactly referred to herein as "qubit," plural "qubits") to perform computational tasks. In the particular realms where quantum mechanics operates, particles of matter can exist in multiple states—such as an "on" state, an "off" state, and both "on" and "off" states simultaneously. Where binary computing using semiconductor processors is limited to using just the on and off states (equivalent to 1 and 0 in binary code), a quantum processor harnesses these quantum states of matter to output signals that are usable in data computing.

Conventional computers encode information in bits. Each bit can take the value of 1 or 0. These 1s and 0s act as on/off switches that ultimately drive computer functions. Quantum computers, on the other hand, are based on qubits, which operate according to two key principles of quantum physics: superposition and entanglement. Superposition means that each qubit can represent both a 1 and a 0 at the same time. Entanglement means that qubits in a superposition can be correlated with each other in a non-classical way; that is, the state of one (whether it is a 1 or a 0 or both) can depend on the state of another, and that there is more information that can be ascertained about the two qubits when they are entangled than when they are treated individually.

Using these two principles, qubits operate as more sophisticated processors of information, enabling quantum computers to function in ways that allow them to solve difficult problems that are intractable using conventional computers. IBM has successfully constructed and demonstrated the operability of a quantum processor (IBM is a registered trademark of International Business Machines corporation in the United States and in other countries.)

A superconducting qubit may include a Josephson junction. A Josephson junction is formed by separating two thin-film superconducting metal layers by a non-superconducting material. When the metal in the superconducting layers is caused to become superconducting—e.g. by reducing the temperature of the metal to a specified cryogenic temperature—pairs of electrons can tunnel from one superconducting layer through the non-superconducting layer to the other superconducting layer. In a superconducting qubit, the Josephson junction—which has a small inductance—is electrically coupled in parallel with one or more capacitive devices forming a nonlinear resonator.

SUMMARY

The illustrative embodiments provide for simultaneously driving adjacent qubit pairs. An embodiment includes a quantum computing system comprising a first cross-resonance (CR) gate having a first control qubit and a first target qubit, wherein the first control qubit is coupled with the first target qubit. The embodiment also includes a second CR gate having a second control qubit and a second target qubit, wherein the second control qubit is coupled with the second target qubit and the first control qubit. The embodiment also includes controller circuitry comprising a processor and a memory having computer readable code, wherein the processor, in response to retrieving and executing the computer readable code, causes the controller circuitry to perform operations comprising first and second iterations of: during a first time period, directing respective CR pulses to the first and second control qubits; during a second time period, directing respective single qubit pulses to the first control qubit and to the second target qubit; during a third time period, directing respective CR pulses to the first and second control qubits; and during a fourth time period, directing respective single qubit pulses to the second control qubit and to the first target qubit. Other embodiments of this aspect include corresponding computer systems, apparatus, and computer programs recorded on one or more computer storage devices, each configured to perform the actions of the embodiment. Thus, the embodiment provides a quantum structure that avoids errors arising from simultaneously pulsing neighboring qubits without the need for an intervening idle qubit.

In some such embodiments, the single qubit pulses of the second time period end before the third time period. In some such embodiments, the CR pulses of the first time period end before the second time period. In some such embodiments, the CR pulses of the third time period end before the fourth time period.

In another embodiment, the processor designates the first CR gate sequence as a first type of CR gate sequence that is applied to the first CR gate and the second CR gate sequence as a second type of CR gate sequence that is applied to the second CR gate.

In another embodiment, the designating of the first CR gate sequence as the first type of CR gate sequence for the first CR gate comprises detecting that the first control qubit is coupled with the second control qubit.

In another embodiment, the designating of the second CR gate sequence as the second type of CR gate sequence for the second CR gate comprises detecting that the second control qubit is coupled with the first control qubit and detecting that the first CR gate is the first type of CR gate.

In another embodiment, during the first and third time periods, the CR pulses to the first control qubit are in phase with each other and the CR pulses to the second control qubit are 180 degrees out of phase with each other.

In another embodiment, a system comprises a processor, one or more computer readable storage media, and program instructions collectively stored on the one or more computer readable storage media, the program instructions executable by the processor to cause the processor to perform operations comprising directing, in a system comprising a first CR gate having a first control qubit and a first target qubit and a second CR gate having a second control qubit and a second target qubit, simultaneous CR pulses to the first and second control qubits during first, third, fifth, and seventh time periods. In the embodiment, the first control qubit is coupled with the first target qubit, and the second control qubit is coupled with the second target qubit and the first control qubit. In the embodiment, during the first and third time periods, the CR pulses to the first control qubit are in phase with each other and the CR pulses to the second control qubit are 180 degrees out of phase with each other. In the embodiment, during the fifth and seventh time periods, the CR pulses to the first control qubit are in phase with each other and the CR pulses to the second control qubit are 180 degrees out of phase with each other. The embodiment also includes directing, following the CR pulses, simultaneous primary pulses to the first control qubit o0f the first CR gate and the second target qubit of the second CR gate during second and sixth time periods and simultaneous secondary pulses to the first target qubit of the first CR gate and the second control qubit of the second CR gate during fourth and eighth time periods.

Another embodiment includes a computer usable program product. The computer usable program product includes a computer-readable storage medium, and program instructions stored on the storage medium.

Another embodiment includes a plurality of CR gates having respective pairs of qubits that are arranged such that the qubits define vertices of a lattice structure and connections between qubits of neighboring CR gates define edges of the lattice structure, where each of the CR gates includes a respective target qubit and a respective control qubit. The embodiment also includes controller circuitry comprising a processor and a memory having computer readable code, where the processor, in response to retrieving and executing the computer readable code, causes the controller circuitry to perform operations comprising generating a first type of echo sequence that generates a CR pulse during a first and fifth time periods, operates on a first control qubit during second and sixth time periods, generates a CR pulse during third and seventh time periods, and operates on a first target during fourth and eighth time periods. The embodiment further includes generating a second type of echo sequence that generates a CR pulse during the first and fifth time periods, operates on a second target qubit during the second and sixth time periods, generates a CR pulse during the third and seventh time periods, and operates on a second control qubit during the fourth and eighth time periods. The embodiment further includes designating each of a first group of the plurality of CR gates as first types of CR gates that receive the first type of echo sequence. The embodiment further includes designating each of a second group of the plurality of CR gates as second types of CR gates that receive the second type of echo sequence.

Thus, the embodiment provides a quantum computing device having a lattice structure and control circuitry that avoids errors arising from simultaneously pulsing neighboring qubits in a lattice arrangement without the need for an intervening idle qubit.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
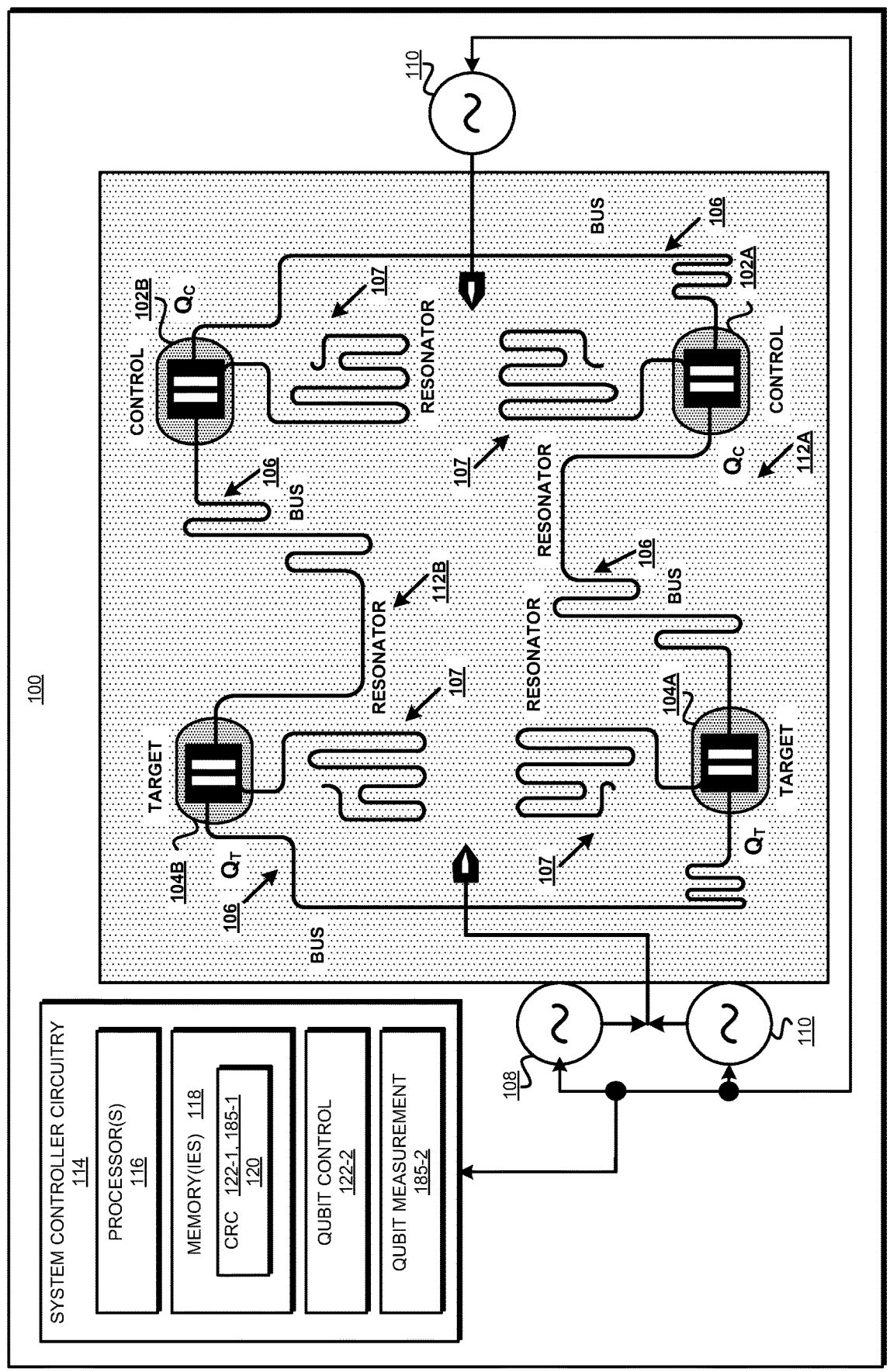
FIG. 1 depicts a block diagram of a gate system in accordance with an illustrative embodiment.

Many conventional quantum computer architectures are arranged with the physical qubits coupled vertically and horizontally to nearest neighbor qubits, forming a two-dimensional grid. However, the frequencies of qubits are not well controllable in some physical systems implementing qubits, and in practice, qubits have a spread in frequency due to imperfections following fabrication. Some ranges of frequencies are such that a gate comprised of two neighboring qubits does not work well, if at all, which is referred to as a frequency collision, which prohibits logical operations between those qubits. For example, this is particularly important for a cross resonance (CR) gate in superconducting qubits. In extreme cases the frequency ranges are sufficiently bad such that a useless qubit results, basically resulting in a hole in the lattice.

The illustrative embodiments recognize that a basic requirement for fault tolerant quantum computing is a universal set of nearly perfect one- and two-qubit gates. As high-fidelity single-qubit operations on superconducting qubits become routine, the focus shifts onto developing robust and scalable two-qubit gates. Although scaling up superconducting systems with many fixed mutual couplings between qubits is simple to experimentally design, it becomes difficult to control the effective interaction between qubits.

The illustrative embodiments also recognize that quantum computers are subject to short coherence times, and are error prone as a computational path length approaches a decoherence limit. For example, a quantum circuit may require coherent operations that take longer than the coherence time of the qubits. Staying in the quantum space longer than a decoherence time limit causes the probability of corrupt quantum data to increase.

The illustrative embodiments further recognize that achieving the advantages of quantum computing requires overcoming the limitations imposed by a variety of error sources including noise (such as decoherence from the environment) and the finite-precision of control (which leads to coherent errors). For example, some quantum computer architectures include physical qubits in a lattice arrangement, where qubits are coupled with one or more nearest neighbor qubits, forming a two-dimensional grid. However, the presence of a physical coupler between operating qubits results in ZZ-type crosstalk that causes a frequency shift in the affected qubits, and thereby interferes with the qubit's proper operation.

One approach to addressing this challenge includes adapting design of hardware and control methods to reduce these error sources and, if possible, apply methods of error-correction during run-time to overcome residual errors. For example, in order to minimize a target qubit's frequency shift due to ZZ-type crosstalk because of other qubits nearby, "idle" qubits that are idle during a CR gate (but are otherwise operational) can be distributed between qubits of neighboring CR gates. However, the illustrative embodiments recognize that an alternative solution would be more desirable that does not require the inclusion of idle components. Therefore, illustrative embodiments present fabrication processes and apparatus that reduce errors such as those caused by crosstalk without the need for including unused, idle components.

According to an embodiment, a qubit lattice comprises target qubits and control qubits positioned at vertices connected by edges. The term "edge" as used herein refers to a part of the lattice that extends between two vertices with no intervening vertices. Thus, a connection that extends from a first vertex to a second vertex and then on to a third vertex will be referred to herein as two or plural edges rather than as a single edge.

An embodiment can be implemented as a software application. The application implementing an embodiment can be configured as a modification of an existing control system, as a separate application that operates in conjunction with an existing control system, a standalone application, or some combination thereof.

Particularly, some illustrative embodiments provide a control system that drives a plurality of CR gates arranged in a lattice structure. As non-limiting examples, in some embodiments, the lattice structure forms rectangular structures or hexagonal structures. In other embodiments, the lattice structure forms any other desired shape, for example according to implementation-specific considerations.

Each CR gate includes a target qubit and a control qubit. In an embodiment, a first CR gate has first control and target qubits, and a second CR gate has second control and target qubits, and each receives respective echo sequences from the control system. The first type of echo sequence directs CR pulses to the first control qubit that are in phase with each other during first and third time periods. The second type of echo sequence directs CR pulses to the second control qubit that are 180 degrees out of phase with each other during the first and third time periods. The first type of echo sequence directs CR pulses to the first control qubit that are in phase with each other during fifth and seventh time periods. The second type of echo sequence directs CR pulses to the second control qubit that are 180 degrees out of phase with each other during the fifth and seventh time periods. The first and second types of echo sequence direct simultaneous respective primary pulses to the first control qubit of the first CR gate and the second target qubit of the second CR gate during second and sixth time periods. The first and second types of echo sequence direct simultaneous respective secondary pulses to the first target qubit of the first CR gate and the second control qubit of the second CR gate during second and sixth time periods.

In some embodiments, a CR gate includes a control qubit and a target qubit coupled through a bus resonator. In some embodiments, the bus resonator includes a superconducting coplanar waveguide resonator. In some embodiments, the CR gate is in communication with one or more RF sources that excite the target qubit and/or the control qubit.

In some embodiments, the CR gate is driven by system controller circuitry. In some embodiments, the system controller circuitry includes one or more processors and one or more computer memories. In some embodiments, the CR gate is in communication with a qubit measurement module. In some embodiments, the qubit control includes any combination of computer-readable code (CRC) and circuitry. In some embodiments, the qubit measurement comprises any combination of CRC and circuitry.

In some embodiments, qubit control causes the gate system to perform operations with qubits. For example, in some embodiments, the qubit control issues an echo sequence that includes a sequence of pulses to the qubits to cause the qubits to perform operations associated with the pulses. In some embodiments, the controller and measurement module are implemented at least in part as discrete circuitry and/or are implemented at least in part as CRC, and the CRC is executed by the one or more processors to cause the gate system to perform the respective operations for the qubit control and qubit measurement.

In some embodiments, the controller emits echo sequences to neighboring CR gates that are arranged to reduce ZZ cross-talk errors in the gates. In some embodiments, the controller designates which echo sequences to send to each of a pair of neighboring CR gates based at least in part on detecting whether the neighboring CR gates are coupled by both control qubits or both target qubits, or coupled by the control qubit of one with the target qubit of the other. In some embodiments, the controller designates which echo sequences to send to each of a pair of neighboring CR gates based at least in part on which combination of echo sequences will avoid simultaneously pulsing coupled qubits of the neighboring gates.

In the illustrated embodiment, the controller generates a type "A" echo sequence and a type "B" echo sequence. In some embodiments, the type "A" echo sequence includes two iterations of a sequence of pulses that begin with a CR pulse to a control qubit, followed by a single qubit pulse to the control qubit, followed by a CR pulse to the control qubit, followed by a single qubit pulse to a target qubit. The type "B" echo sequence includes two iterations of a sequence of pulses that begin with a CR pulse to a control qubit, followed by a single qubit pulse to a target qubit, followed by a CR pulse to the control qubit, followed by a single qubit pulse to the control qubit. In some embodiments, the controller simultaneously directs pulses of both types of echo sequences to the CR gates such that, for each single-qubit type of pulse in the two echo sequences, one echo sequence is emitting a single qubit pulse to a control qubit pulse while the other is emitting a single qubit pulse to a target qubit pulse.

In the illustrated embodiment, a qubit control includes two echo sequences that each include four pi pulses. In alternative embodiments the qubit control can include additional pulses, for example sixteen pulses. In the illustrated embodiment, each of the single qubit pulses is an X operation, which is also referred to as a NOT operation or bit flip for a qubit. In some alternative embodiments, the qubit control pulses are for other quantum operations.

In the illustrated embodiment, the qubit control alternates between applying the single-qubit types of pulses to the control and target qubits of an associated CR gate with CR pulses to the control gates. For example, in some embodiments, qubit control operates as follows: during a first time period, directing respective CR pulses to the first and second control qubits; during a second time period, directing respective single qubit pulses to the first control qubit and to the second target qubit; during a third time period, directing respective CR pulses to the first and second control qubits; during a fourth time period, directing respective single qubit pulses to the second control qubit and to the first target qubit; during a fifth time period, directing respective CR pulses to the first and second control qubits; during a sixth time period, directing respective single qubit pulses to the first control qubit and to the second target qubit; during a seventh time period, directing respective CR pulses to the first and second control qubits; during an eighth time period, directing respective single qubit pulses to the second control qubit and to the first target qubit. In such embodiments, the CR pulses of the first, third, fifth, and seventh time periods end before the second, fourth, sixth, and eight time periods, respectively, and the single qubit pulses of the second, fourth, and sixth time periods end before the third, fifth, and seventh time periods, respectively. In such embodiments, during the first and third time periods, the CR pulses to the first control qubit are 180 degrees out of phase with each other, whereas the CR pulses to the second control qubit are in phase with each other. In such embodiments, during the third and fifth time periods, the CR pulses to the first control qubit are in phase with each other, whereas the CR pulses to the second control qubit are 180 degrees out of phase with each other. In such embodiments, during the fifth and seventh time periods, the CR pulses to the first control qubit are 180 degrees out of phase with each other, whereas the CR pulses to the second control qubit are in phase with each other.

With reference to the figures and in particular with reference to FIG. 1, these figures are example diagrams of structures and fabrication processes in which illustrative embodiments may be implemented. FIG. 1 is only an example and is not intended to assert or imply any limitation with regard to the environments in which different embodiments may be implemented. A particular implementation may make many modifications to the depicted environments based on the following description.

FIG. 1 depicts a block diagram of a gate system 100 that includes a first CR gate 112A and a second CR gate 112B in accordance with an illustrative embodiment. The example embodiment of the CR gates 112A, 112B includes two qubits, each with a respective control qubit (QC) 102A, 102B, and a respective target qubit (QT) 104A, 104B, connected through a bus 106 and coupled via resonators 107, for example a superconducting coplanar waveguide resonator.

In the illustrated embodiment, the gate system 100 comprises two radio frequency (RF) sources 108 and 110. In an embodiment, both RF sources 108 and 110 are used to excite the target qubits 104, while only the RF source 110 is used to excite the control qubit 102. The gate system 100 also comprises system controller circuitry 114, which comprises one or more processors 116 and one or more memories 118, which contain computer-readable code (CRC) 120. There are also qubit control 122 and qubit measurement 124. In some embodiments, the qubit control 122 can be comprised of two or more elements, for example comprised of CRC 122-1 and circuitry 122-2. In some embodiments, the qubit measurement 124 can be comprised of two or more elements, for example comprised of CRC 124-1 and circuitry 124-2. In some embodiments, qubit control 122 causes the gate system 100 to perform operations with qubits 102A/B, 104A/B according to embodiments described below. For example, in some embodiments, the qubit control 122 issues an echo sequence that includes a sequence of pulses to the qubits 102A/B, 104A/B to cause the qubits 102A/B, 104A/B to perform operations associated with the pulses. In some embodiments, the control 122 and measurement 124 are implemented at least in part as discrete circuitry 122-2, 124-2, and/or are implemented at least in part as CRC 120, and the CRC 120 would be executed by the one or more processors 116 to cause the gate system 100 to perform the respective operations for the qubit control 122-1 and qubit measurement 124-1.

Figure 2A:
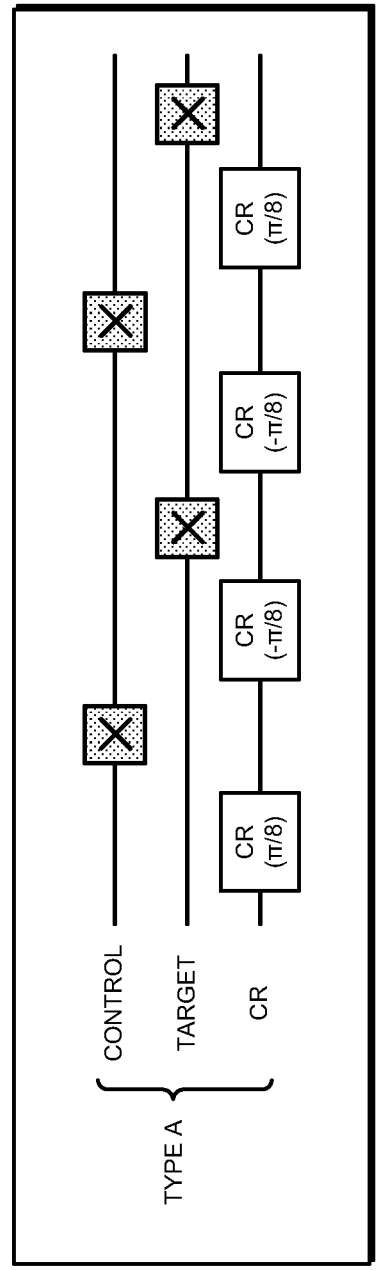
FIG. 2A depicts a signal diagram for a type A echo sequence in accordance with an illustrative embodiment.
Figure 2B:
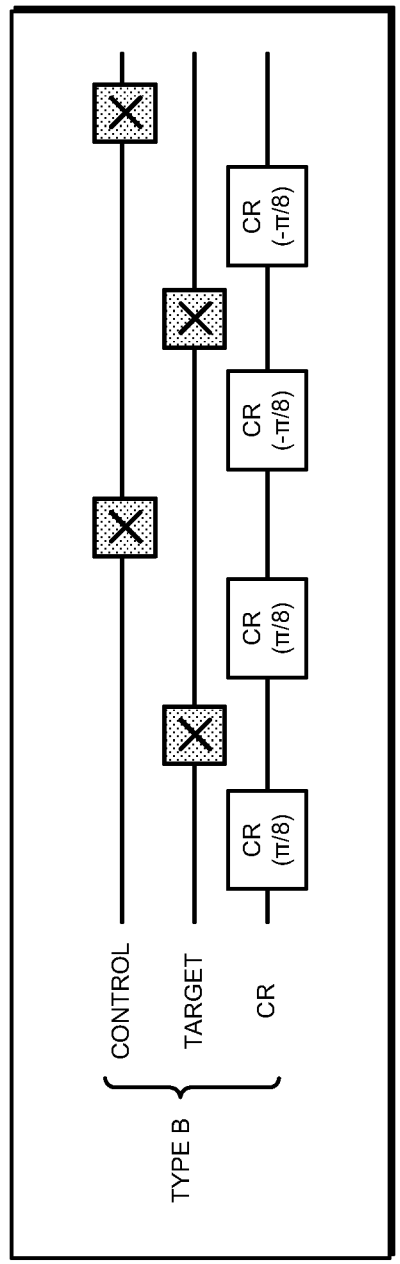
FIG. 2B depicts a signal diagram for a type B echo sequence in accordance with an illustrative embodiment.

With reference to FIGS. 2A and 2B, these figures depict echo sequence diagrams in accordance with respective illustrative embodiments. The illustrated echo sequences shown in FIGS. 2A and 2B can be applied by neighboring CR gates to reduce ZZ cross-talk errors. In a particular embodiment, the illustrated echo sequences are examples of echo sequences issued by a qubit control 122 shown in FIG. 1.

The example embodiment shown in FIG. 2A is a type "A" echo sequence, which is applied to a CR gate referred to herein as a type "A" CR gate. The example embodiment shown in FIG. 2B is a type "B" echo sequence, which is applied to a CR gate referred to herein as a type "B" CR gate. In a particular embodiment having a type A CR gate and a type B CR gate, each CR gate receives an echo sequence from a respective qubit control, such as qubit control 122 shown in FIG. 1. Also, the type A CR gate and the type B CR gate each include a CR gate, such as the CR gates 112A and 112B, respectively, as shown in FIG. 1. More specifically, in some such embodiments, a first qubit control 122 generates the type A echo sequence for CR gate 112A as a type A CR gate, and generates the type B echo sequence for CR gate 112B as a type B CR gate.

In the illustrated embodiment, a qubit control includes two echo sequences that each include four pi pulses. In alternative embodiments the qubit control can include additional pulses, for example eight or sixteen pulses. In the illustrated embodiment, each of the single qubit pulses is an X operation, which is also referred to as a NOT operation or bit flip for a qubit. In some alternative embodiments, the qubit control pulses are for other quantum operations.

In the illustrated embodiment, the qubit control alternates between applying the pulses to the control and target qubits of an associated CR gate. For example, in some embodiments, a first qubit control associated with a type A CR gate generates a first type of echo sequence that generates a CR pulse during a first and fifth time periods, operates on a first control qubit during second and sixth time periods, generates a CR pulse during third and seventh time periods, and operates on a first target during fourth and eighth time periods. During the same eight time periods, a second qubit control associated with a type B CR gate generates a second type of echo sequence that generates a CR pulse during the first and fifth time periods, operates on a second target qubit during the second and sixth time periods, generates a CR pulse during the third and seventh time periods, and operates on a second control qubit during the fourth and eighth time periods.

In some embodiments, the single qubit pulses applied to the control qubit and to the target qubit of the type A echo sequence are synchronized with the single qubit pulses applied to the control qubit and to the target qubit of the type B echo sequence for entangled CR gates. In some embodiments, the amplitude and phase of the CR pulses are different at least some of the time. For example, in some embodiments, the first qubit control associated with the type A CR gate generates the CR pulse during the first and third time periods such that the CR pulse during the first time period is 180 degrees out of phase with the CR pulse during the third time period, and the type B CR gate generates the CR pulse during the first and third time periods such that the CR pulse during the first time period is in phase with the CR pulse during the third time period. In some such embodiments, the first qubit control associated with the type A CR gate generates the CR pulse during the third and fifth time periods such that the CR pulse during the third time period is in phase with the CR pulse during the fifth time period, and the type B CR gate generates the CR pulse during the third and fifth time periods such that the CR pulse during the third time period is 180 degrees out of phase with the CR pulse during the fifth time period. Also in some such embodiments, the first qubit control associated with the type A CR gate generates the CR pulse during the fifth and seventh time periods such that the CR pulse during the fifth time period is 180 degrees out of phase with the CR pulse during the seventh time period, and the type B CR gate generates the CR pulse during the fifth and seventh time periods such that the CR pulse during the fifth time period is in phase with the CR pulse during the seventh time period.

Figure 3:
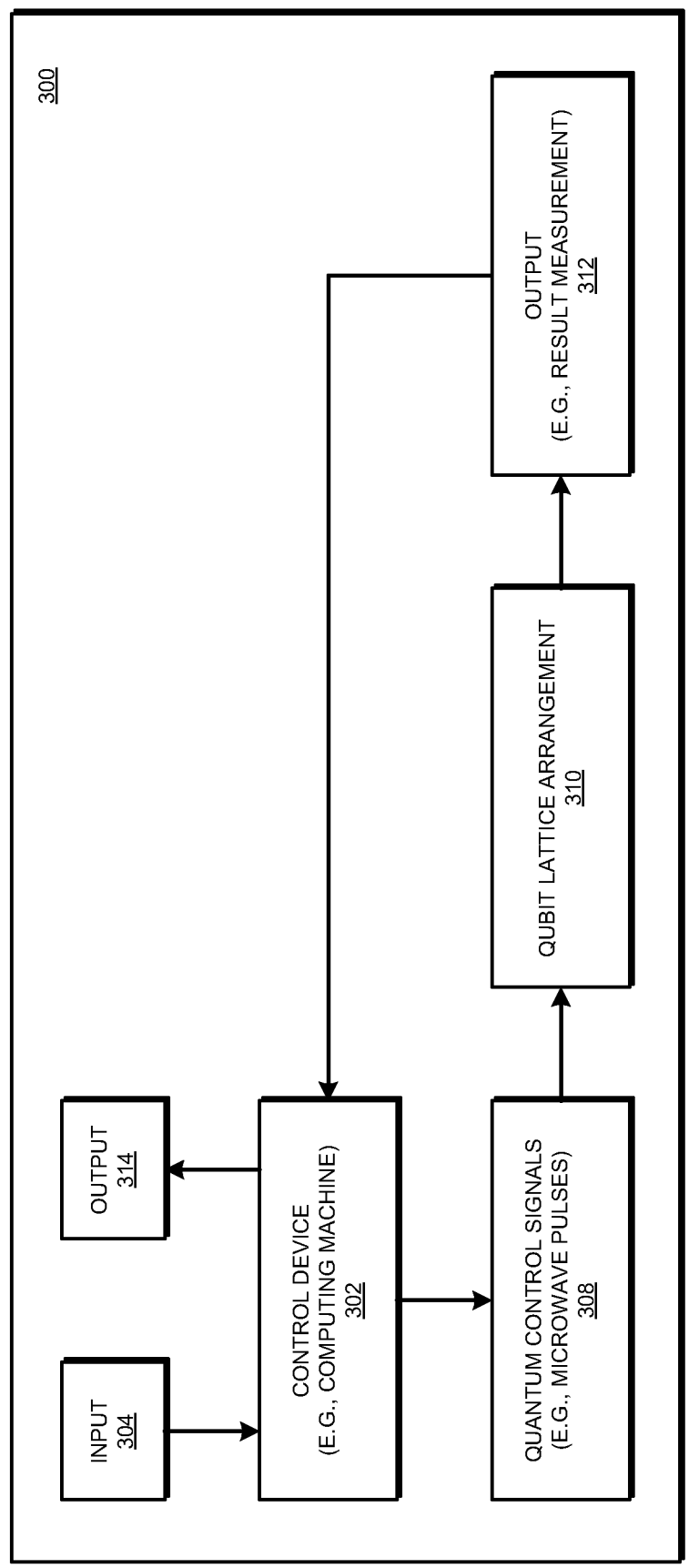
FIG. 3 depicts a block diagram of an example quantum computing system in accordance with an illustrative embodiment.

With reference to FIG. 3, this figure depicts a block diagram of an example quantum computing system 300 in accordance with an illustrative embodiment. The example embodiment includes qubit lattice arrangement 310 that includes an array of qubits, CR gates, and associated gate systems. In a particular embodiment, the qubits, CR gates, and gate systems of the lattice arrangement 310 include examples of the qubits 102A/B, 104A/B, CR gates 112A/B, and gate system 100 of FIG. 1.

In the illustrated embodiment, the system 300 includes controller circuitry 302, that receives input 304, such as from a program, process, user or other suitable entity. Based on the input 304, the controller circuitry 302 generates quantum signals 308 that operate selected ones of the qubits in the qubit lattice arrangement 310. The output from the lattice arrangement 310 comprises, for example, measurements of the qubit states that are fed back to the controller circuitry 302, such as for providing corresponding output 314 representing the experimental results or the like. In an embodiment, the controller circuitry 302 is an example of the system controller circuitry 114 shown in FIG. 1, generates echo sequences such as the type A and type B echo sequences shown in FIGS. 2A and 2B, and directs the type A and type B echo sequences to corresponding CR gates such as the CR gates shown in FIGS. 4 and 5. In an embodiment, the controller circuitry 302 comprises one or more processors and one or memories having computer readable code, wherein the one or more processors, in response to retrieving and executing the computer readable code, cause the controller circuitry 302 to perform operations comprising generating echo sequences such as the type A and type B echo sequences shown in FIGS. 2A and 2B, and directing the type A and type B echo sequences to corresponding type A and type B CR gates such as the CR gates shown in FIGS. 4 and 5.

Figure 4:
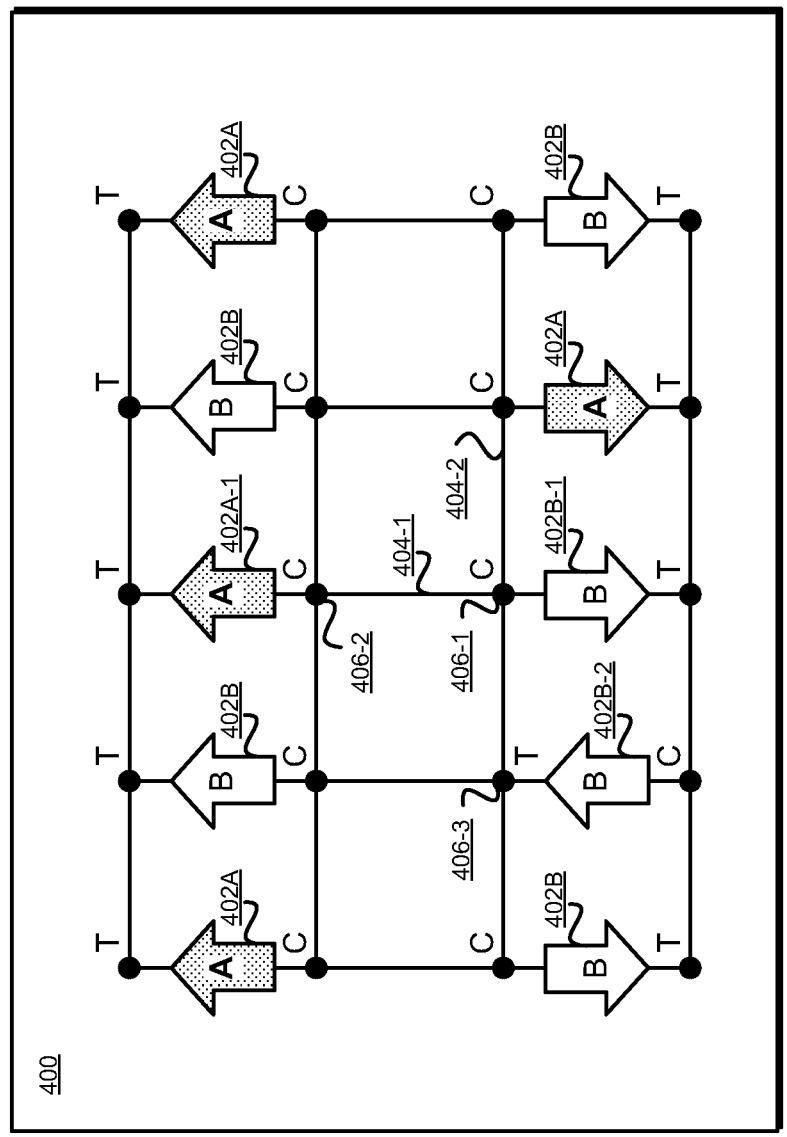
FIG. 4 depicts a schematic diagram of a square grid-like lattice arrangement in accordance with an illustrative embodiment.

With reference to FIG. 4, this figure depicts a schematic diagram of a grid-like lattice arrangement 400 in accordance with an illustrative embodiment. In the illustrated embodiment, the lattice arrangement includes target qubits T and control qubits C of CR gates 402 positioned on the vertices of squares (or more generally, rectangles). In a particular embodiment, the lattice arrangement 400 is an example of the qubit lattice arrangement 310 of FIG. 3.

In the illustrated embodiment, block arrows shown on the edges represent CR gates 402. Each of the block arrows points from the CR gate's control qubit C towards the CR gate's target qubit T. In the illustrated embodiment, the lattice arrangement 400 includes type A CR gates 402A (block arrows A) and type B CR gates 402B (block arrows B). In a particular embodiment, the type A and type B CR gates 402A,B are examples of the CR gate 112 of FIG. 1.

In some embodiments, each CR gate 402A,B is configured to operate as either a type A CR gate 402A or a type B CR gate 402B according to one or more design rules for the lattice arrangement 400. For example, in some embodiments, the design rules include:
1. If an edge connects either two control qubits or two target qubits, then the CR gates associated with those two control or target qubits are different types (one is a type A CR gate and the other is a type B CR gate).
2. If an edge connects a control qubit to a target qubit or vice-versa, then the CR gates associated with those control and target qubits are the same type (both are type A CR gates or type B CR gates).

An example of an implementation of Rule 1 above is shown in FIG. 4 with reference to edge 404-1, which connects a first control qubit 406-1 and a second control qubit 406-2. Rule 1 applies because the edge 404-1 connects two of the same types of qubits (both qubits 406-1 and 406-2 are control qubits). The first control qubit 406-1 is associated with a first type B CR gate 402B-1 and the second control qubit 406-2 is associated with a first type A CR gate 402A-1. Thus, the two associated gates 406A-1 and 406B-1 are different types of CR gates.

An example of an implementation of Rule 2 above is shown in FIG. 4 with reference to edge 404-2, which connects a first control qubit 406-1 and a first target qubit 406-3. Rule 2 applies because the edge 404-2 connects two different types of qubits (control qubit 406-1 and target qubit 406-3). The first control qubit 406-1 is associated with a first type B CR gate 402B-1 and the first target qubit 406-3 is associated with a second type B CR gate 402B-1. Thus, the two associated gates 402B-1 and 402B-2 are the same types of CR gates.

By arranging the CR gates 402A,B according to these design rules, ZZ cancellation is realized by staggering the X pulses. Each time an X pulse is applied on either a control or target qubit C or T, the X operation flips the sign of ZZ, and ZZ cancellation happens when the number of +ZZ is equal to the number of −ZZ.

Thus, according to the design rules, if a control qubit has a neighboring target qubit (i.e., connected by an edge to a target qubit), then their respective associated CR gates 402A,B will be the same types of CR gates 402A,B (i.e., both are a type A CR gates 402A or both are type B CR gates 402B), which will apply respective simultaneous pulses to the same qubit types (if both are type A, simultaneous pulses to respective control qubits; if both are type B, simultaneous pulses to respective target qubits), so the two neighboring control and target qubits will not both receive simultaneous pulses. Similarly, according to the design rules, if a control qubit has a neighboring control qubit (i.e., connected by an edge to a control qubit), then their respective associated CR gates 402A,B are different types of CR gates 402A,B (i.e., one is a type A CR gate 402A and the other is a type B CR gate 402B), which will apply simultaneous pulses to different qubit types (e.g., simultaneously pulse type A control qubit and type B target qubit), so the two neighboring control qubits will not both receive simultaneous pulses. The same result occurs if a target qubit has a neighboring target qubit.

Figure 5:
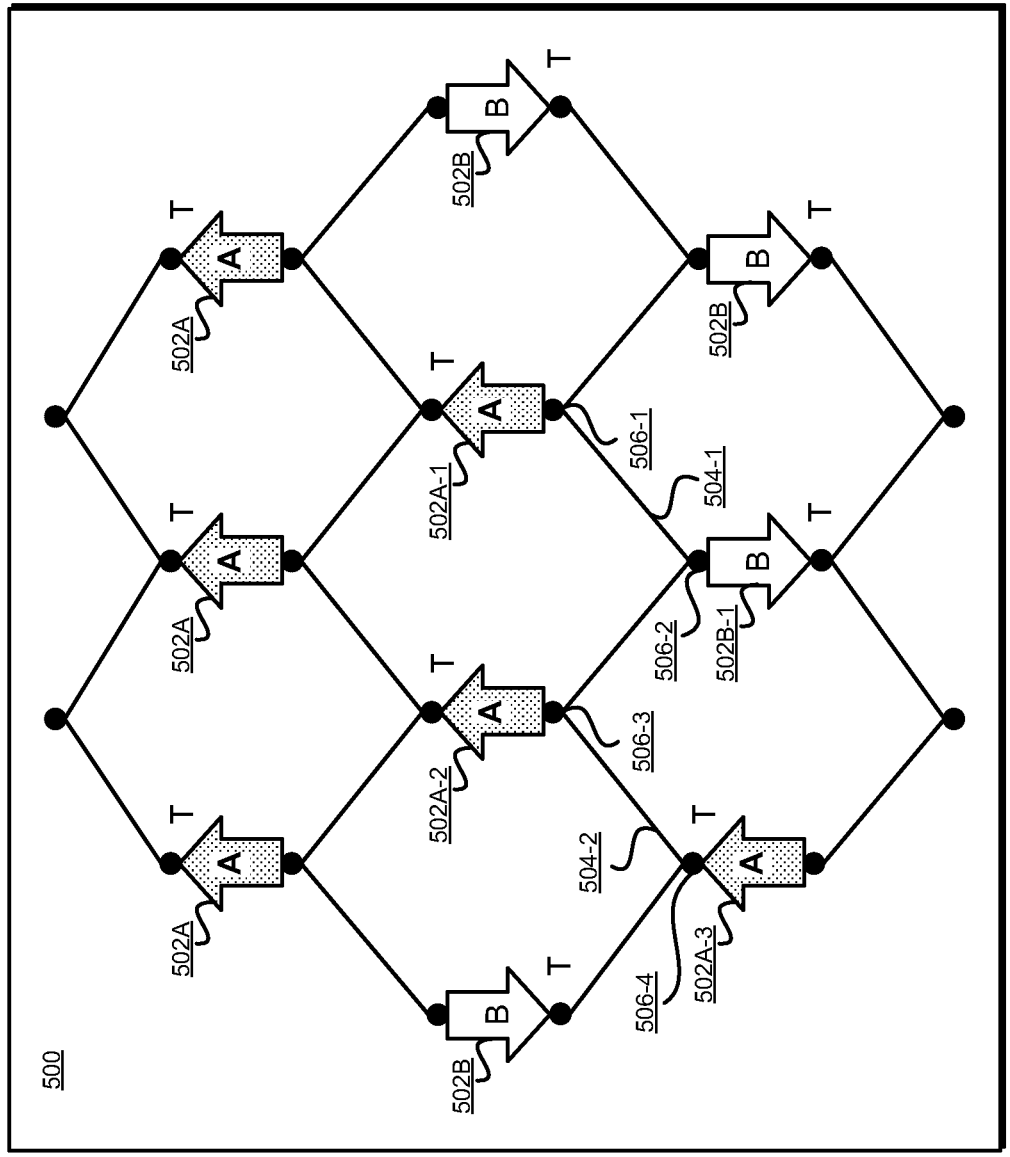
FIG. 5 depicts a schematic diagram of a hexagonal grid-like lattice arrangement in accordance with an illustrative embodiment.

With reference to FIG. 5, this figure depicts a schematic diagram of a grid-like lattice arrangement 500 in accordance with an illustrative embodiment. In the illustrated embodiment, the lattice arrangement includes target qubits T and control qubits C of CR gates 502A,B positioned on the vertices of hexagonal structures. In a particular embodiment, the lattice arrangement 500 is an example of the qubit lattice arrangement 310 of FIG. 3.

In the illustrated embodiment, block arrows shown on the edges represent CR gates 502. Each of the block arrows points from the CR gate's control qubit C towards the CR gate's target qubit T. In the illustrated embodiment, the lattice arrangement 500 includes type A CR gates 502A (block arrows A) and type B CR gates 502B (block arrows B). In a particular embodiment, the type A and type B CR gates 502A,B are examples of the CR gate 112 of FIG. 1.

As with the lattice arrangement 400 shown in FIG. 4, the same design rules still apply for the hexagonal arrangement shown in FIG. 5. The design rules include:
1. If an edge connects either two control qubits or two target qubits, then the CR gates associated with those two control or target qubits are different types (one is a type A CR gate and the other is a type B CR gate).
2. If an edge connects a control qubit to a target qubit or vice-versa, then the CR gates associated with those control and target qubits are the same type (both are type A CR gates or type B CR gates).

An example of an implementation of Rule 1 above is shown in FIG. 5 with reference to edge 504-1, which connects a first control qubit 506-1 and a second control qubit 506-2. Rule 1 applies because the edge 504-1 connects two of the same types of qubits (both qubits 506-1 and 506-2 are control qubits). The first control qubit 506-1 is associated with a first type A CR gate 502A-1 and the second control qubit 506-2 is associated with a first type B CR gate 502B-1. Thus, the two associated gates 506A-1 and 506B-1 are different types of CR gates.

An example of an implementation of Rule 2 above is shown in FIG. 5 with reference to edge 504-2, which connects a third control qubit 506-3 and a first target qubit 506-4. Rule 2 applies because the edge 504-2 connects two different types of qubits (control qubit 506-3 and target qubit 506-4). The third control qubit 506-3 is associated with a second type A CR gate 502A-2 and the first target qubit 506-4 is associated with a third type A CR gate 502A-3. Thus, the two associated gates 502A-2 and 502A-3 are the same types of CR gates.

Just as with the embodiment shown in FIG. 4 that included a rectangular grid layout, the same concepts can be applied to other lattice arrangements, such as the hexagonal arrangement shown in FIG. 5 for reducing or eliminating ZZ crosstalk errors.

Figure 6:
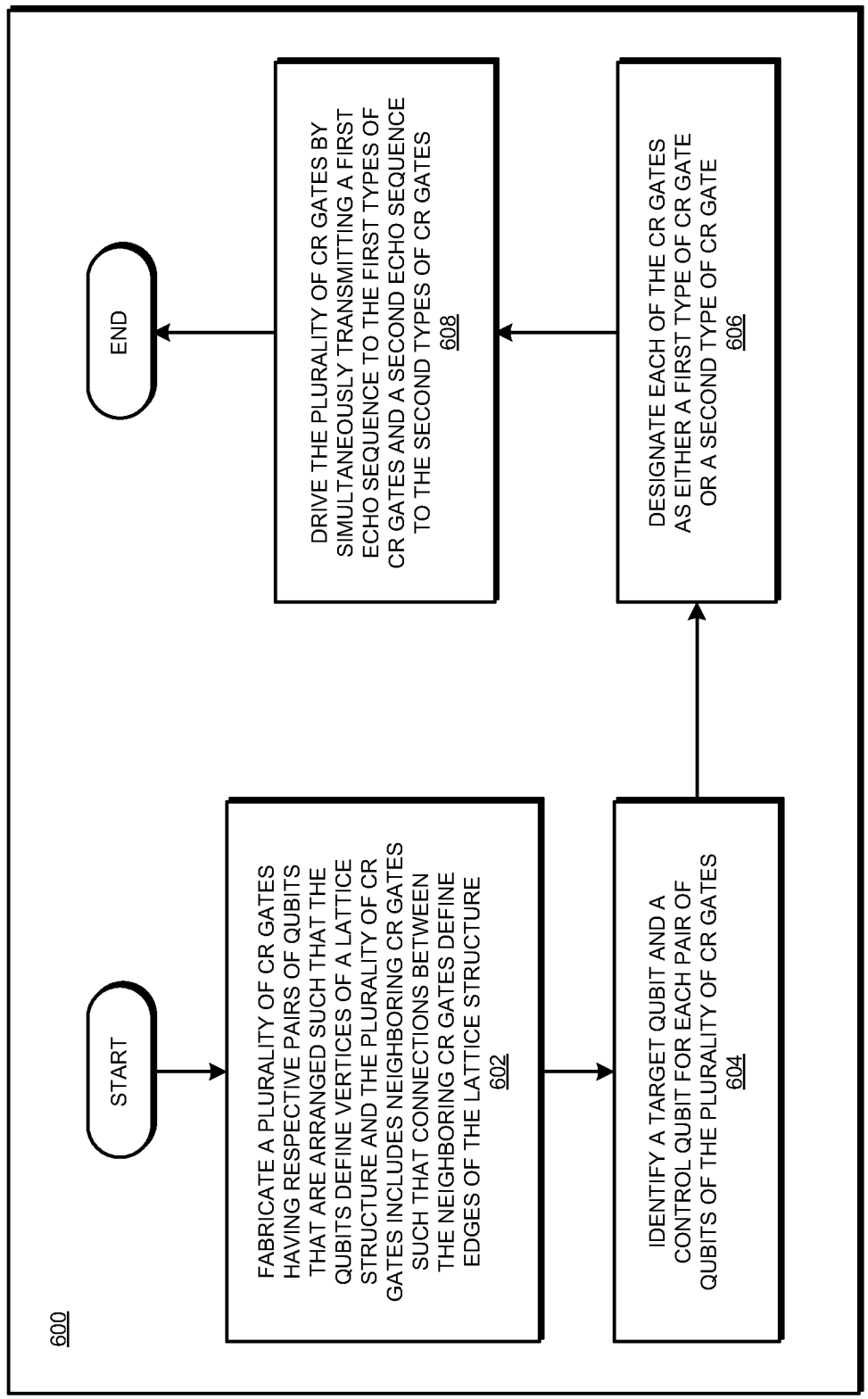
FIG. 6 depicts a flowchart of an example process for fabricating and configuring a quantum computing device in accordance with an illustrative embodiment.

With reference to FIG. 6, this figure depicts a flowchart of an example process 600 for fabricating and configuring a quantum computing device in accordance with an illustrative embodiment. In an embodiment, at block 602, the process fabricates an array of CR gates having respective pairs of qubits that are arranged such that the qubits are vertices of a lattice structure and neighboring CR gates are connected by edges of the lattice structure. Next, at block 604, the process designates which of the pair of qubits is a target qubit and which is a control qubit for each CR gate in the lattice structure. Next, at block 606, the process designates whether each CR gate is a first type of CR gate that uses a first echo sequence or a second type of CR gate that uses a second type of echo sequence. Next, at block 608, the process configures each CR gate to drive its respective target and control qubits according to whether the CR gate is designated as a first or second type of CR gate.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A quantum computing system comprising:
a first cross-resonance (CR) gate having a first control qubit and a first target qubit, wherein the first control qubit is coupled with the first target qubit;
a second CR gate having a second control qubit and a second target qubit, wherein the second control qubit is coupled with the second target qubit and the first control qubit; and
controller circuitry comprising a processor and a memory having computer readable code, wherein the processor, in response to retrieving and executing the computer readable code, causes the controller circuitry to perform operations comprising:
during a first time period, directing respective CR pulses to the first and second control qubits;
during a second time period, directing respective single qubit pulses to the first control qubit and to the second target qubit;
during a third time period, directing respective CR pulses to the first and second control qubits; and
during a fourth time period, directing respective single qubit pulses to the second control qubit and to the first target qubit.

2. The quantum computing system of claim 1, wherein the single qubit pulses of the second time period end before the third time period.

3. The quantum computing system of claim 2, wherein the CR pulses of the first time period end before the second time period.

4. The quantum computing system of claim 3, wherein the CR pulses of the third time period end before the fourth time period.

5. The quantum computing system of claim 1, wherein the processor, in response to retrieving and executing the computer readable code, causes the controller circuitry to perform operations further comprising:
designating a first CR gate sequence as a first type of CR gate sequence that is applied to the first CR gate; and
designating a second CR gate sequence as a second type of CR gate sequence that is applied to the second CR gate.

6. The quantum computing system of claim 5, wherein the designating of the first CR gate sequence as the first type of CR gate sequence for the first CR gate comprises detecting that the first control qubit is coupled with the second control qubit.

7. The quantum computing system of claim 5, wherein the designating of the second CR gate sequence as the second type of CR gate sequence for the second CR gate comprises detecting that the second control qubit is coupled with the first control qubit and detecting that the first CR gate is the first type of CR gate.

8. The quantum computing system of claim 1, wherein, during the first and third time periods, the CR pulses to the first control qubit are in phase with each other and the CR pulses to the second control qubit are 180 degrees out of phase with each other.

9. A method comprising:
directing, in a system comprising a first cross-resonance (CR) gate having a first control qubit and a first target qubit and a second CR gate having a second control qubit and a second target qubit, simultaneous CR pulses to the first and second control qubits during first, third, fifth, and seventh time periods,
wherein the first control qubit is coupled with the first target qubit,
wherein the second control qubit is coupled with the second target qubit and the first control qubit,
wherein, during the first and third time periods, the CR pulses to the first control qubit are in phase with each other and the CR pulses to the second control qubit are out of phase with each other,
wherein, during the fifth and seventh time periods, the CR pulses to the first control qubit are in phase with each other and the CR pulses to the second control qubit are out of phase with each other; and
directing, following the CR pulses, simultaneous primary pulses to the first control qubit of the first CR gate and the second target qubit of the second CR gate during second and sixth time periods and concurrent secondary pulses to the first target qubit of the first CR gate and the second control qubit of the second CR gate during fourth and eighth time periods.

10. The method of claim 9, wherein the single qubit pulses of the second and sixth time periods end before the third and seventh time periods, respectively.

11. The method of claim 10, wherein the CR pulses of the first and fifth time periods end before the second and sixth time periods, respectively.

12. The method of claim 11, wherein the CR pulses of the third and seventh time periods end before the fourth and eighth time periods, respectively.

13. The method of claim 9, further comprising:
designating the first CR gate as a first type of CR gate; and
designating the second CR gate as a second type of CR gate.

14. The method of claim 13, wherein the designating of the first CR gate as the first type of CR gate comprises detecting that the first control qubit is coupled with the second control qubit.

15. The method of claim 13, wherein the designating of the second CR gate as the second type of CR gate comprises detecting that the second control qubit is coupled with the first control qubit and detecting that the first CR gate is the first type of CR gate.

16. The method of claim 9, further comprising:
generating a first echo sequence that includes the first primary pulse followed by the first secondary pulse; and
generating a second echo sequence that includes the second primary pulse followed by the second secondary pulse.

17. The method of claim 9, wherein, during the third and fifth time periods, the CR pulses to the first control qubit are 180 degrees out of phase with each other and the CR pulses to the second control qubit are in phase with each other.

18. A computer program product for driving a quantum device, the computer program product comprising one or more computer readable storage media, and program instructions collectively stored on the one or more computer readable storage media, the program instructions executable by controller circuitry to cause the controller circuitry to perform operations comprising:

directing, in a system comprising a first cross-resonance (CR) gate having a first control qubit and a first target qubit and a second CR gate having a second control qubit and a second target qubit, simultaneous CR pulses to the first and second control qubits during first, third, fifth, and seventh time periods, wherein the first control qubit is coupled with the first target qubit, wherein the second control qubit is coupled with the second target qubit and the first control qubit, wherein, during the first and third time periods, the CR pulses to the first control qubit are in phase with each other and the CR pulses to the second control qubit are out of phase with each other, wherein, during the fifth and seventh time periods, the CR pulses to the first control qubit are in phase with each other and the CR pulses to the second control qubit are out of phase with each other; and directing, following the CR pulses, simultaneous primary pulses to the first control qubit of the first CR gate and the second target qubit of the second CR gate during second and sixth time periods and simultaneous secondary pulses to the first target qubit of the first CR gate and the second control qubit of the second CR gate during fourth and eighth time periods.

19. The computer program product of claim 18, wherein the program instructions are stored in a computer readable storage device in a data processing system, and wherein the stored program instructions are transferred over a network from a remote data processing system.

20. The computer program product of claim 18, wherein the stored program instructions are stored in a computer readable storage device in a server data processing system, and wherein the stored program instructions are downloaded over a network to a remote data processing system for use in a computer readable storage device associated with the remote data processing system, further comprising:
program instructions to meter use of the computer usable code associated with the request; and
program instructions to generate an invoice based on the metered use.

* * * * *